United States Patent [19]

Yamamoto et al.

[11] 4,004,205
[45] Jan. 18, 1977

[54] HYBRID SERVO CONTROL SYSTEM

[75] Inventors: Makoto Yamamoto, Hachioji; Hironobu Katayama, Sagamihara, both of Japan

[73] Assignees: Hitachi Electronics, Ltd.; Nippon Hoso Kyokai, both of Tokyo, Japan

[22] Filed: Dec. 6, 1973

[21] Appl. No.: 422,486

[52] U.S. Cl. .............................. 318/608; 318/329; 360/70; 360/75
[51] Int. Cl.² ..................... G05B 1/02; G05B 21/02
[58] Field of Search .......... 318/310, 311, 329, 685, 318/696, 314, 600, 608; 360/70; 178/6.6 P; 179/100.2 T; 235/151.1

[56] References Cited
UNITED STATES PATENTS

| | | | |
|---|---|---|---|
| 3,758,710 | 9/1973 | Crosno | 178/69.5 |
| 3,836,756 | 9/1974 | Yamamoto et al. | 318/608 X |

Primary Examiner—Robert K. Schaefer
Assistant Examiner—John J. Feldhaus
Attorney, Agent, or Firm—Sughrue, Rothwell, Mion, Zinn & Macpeak

[57] ABSTRACT

A hybrid servo control system for controlling, for example a rotation of a capstan driving motor or a head motor of a video tape recorder comprises at least an integral control loop including an analog phase comparator for detecting in an analog mode a phase difference between a signal related to the rotation of the capstan driving motor or the head motor to be controlled and a reference signal so as to produce an analog amount corresponding to said phase difference, an analog-digital converter for converting said analog amount into a digital amount and a digital frequency modulator for frequency modulating in a digital mode clock pulses with said digital amount.

15 Claims, 11 Drawing Figures

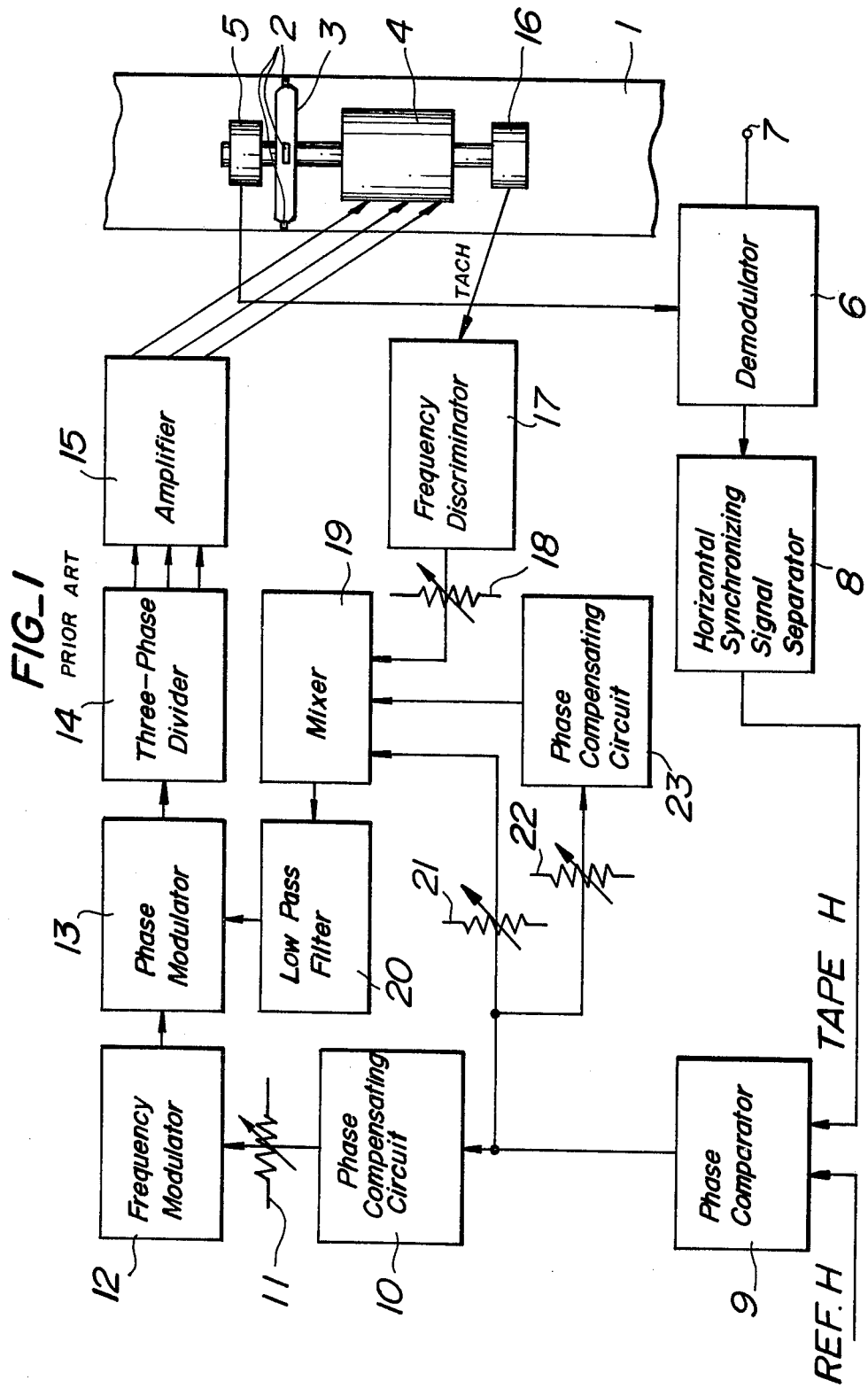

FIG_2a
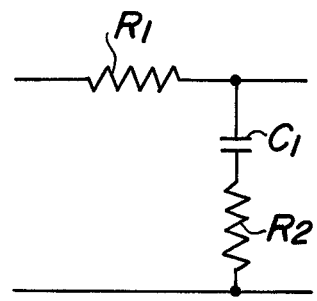
FIG_2b
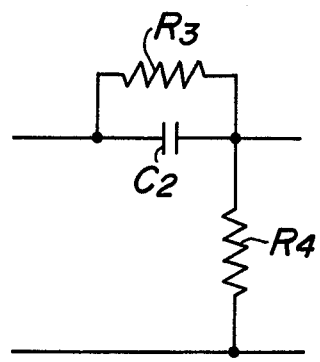
FIG_2c
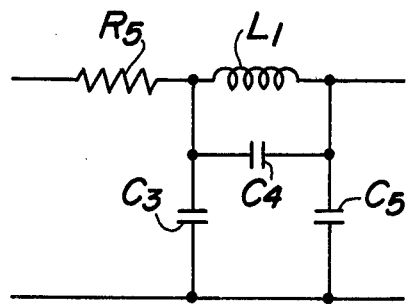

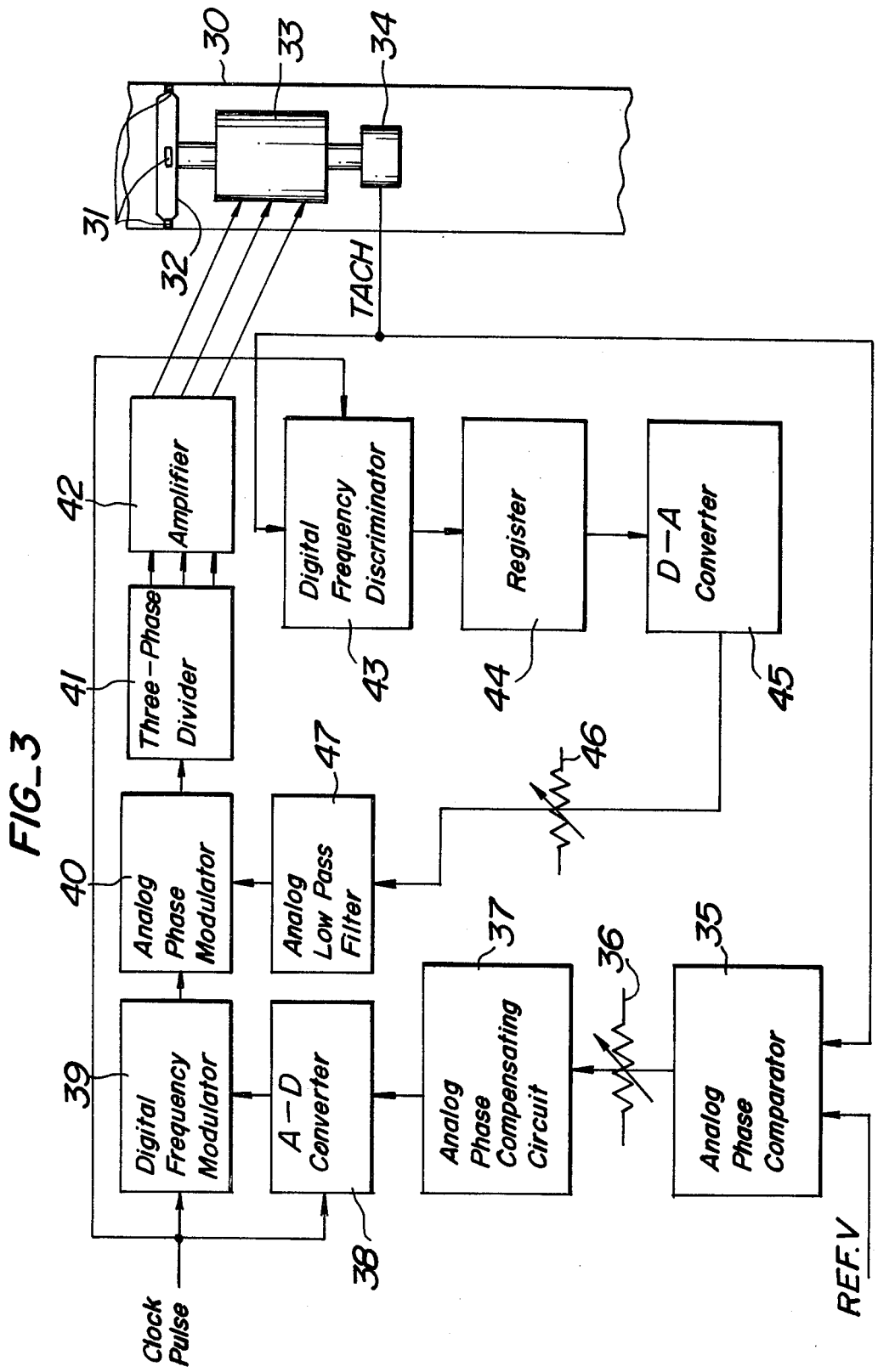
FIG_3

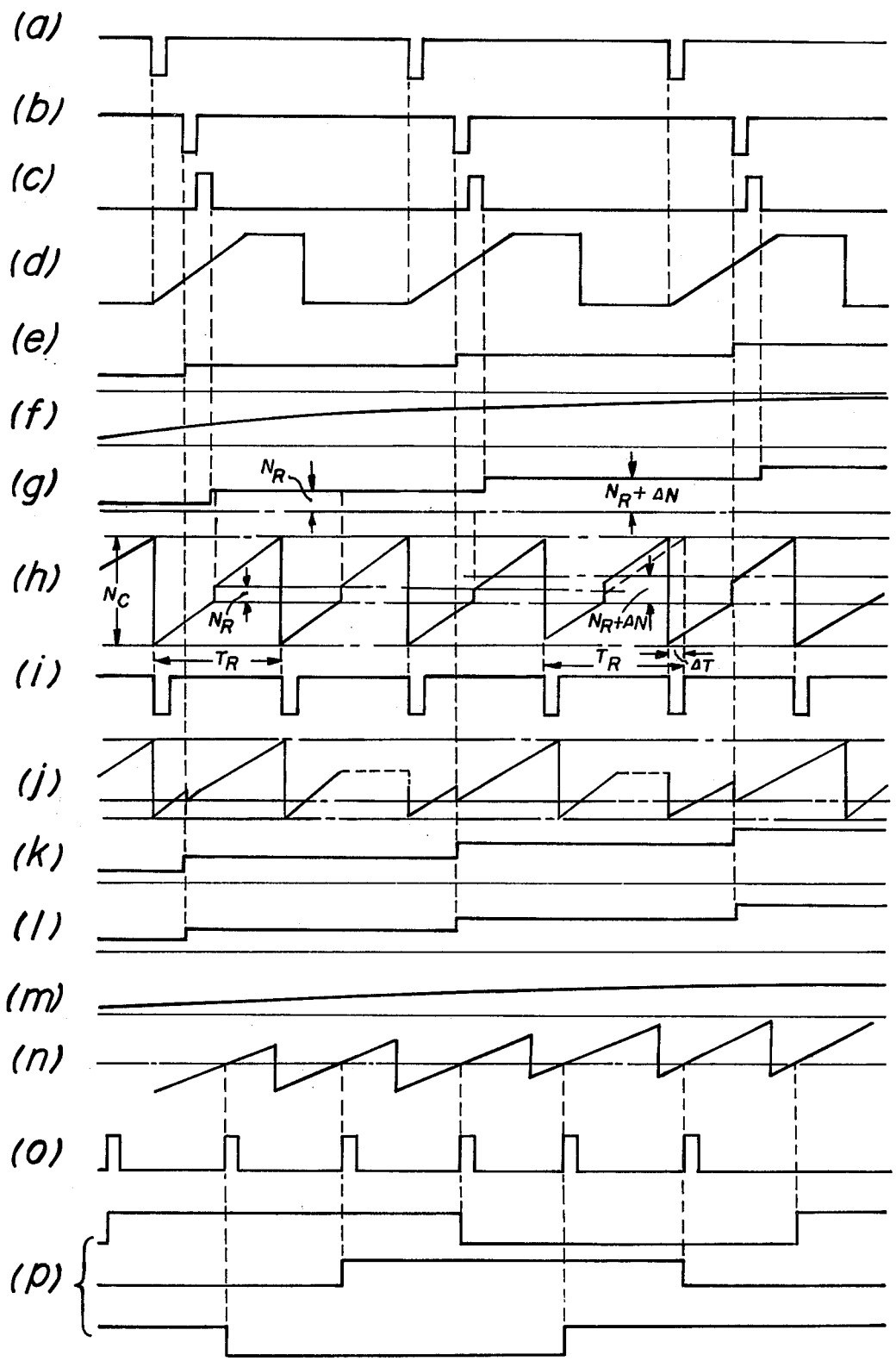
FIG_4

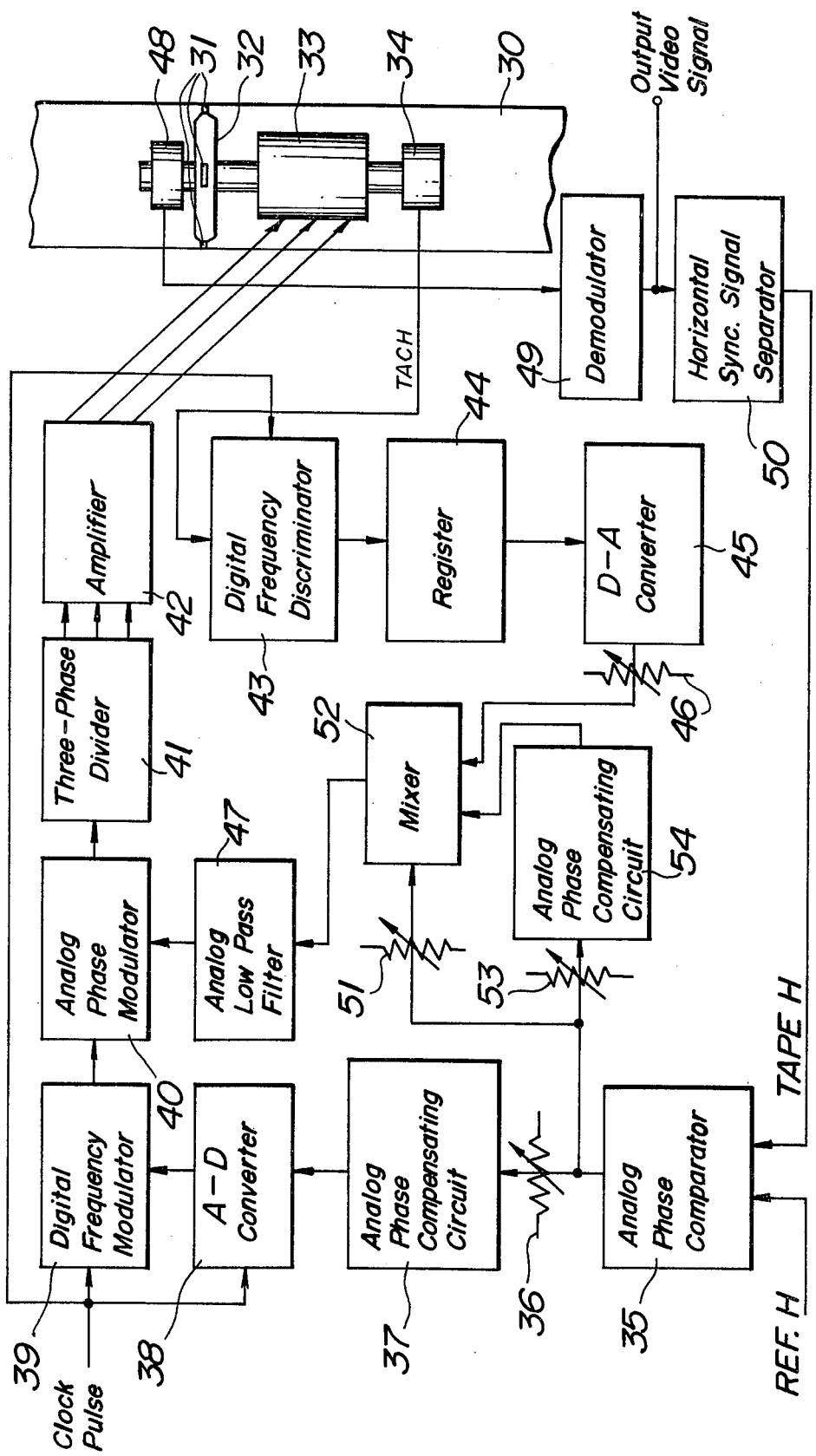
FIG._5

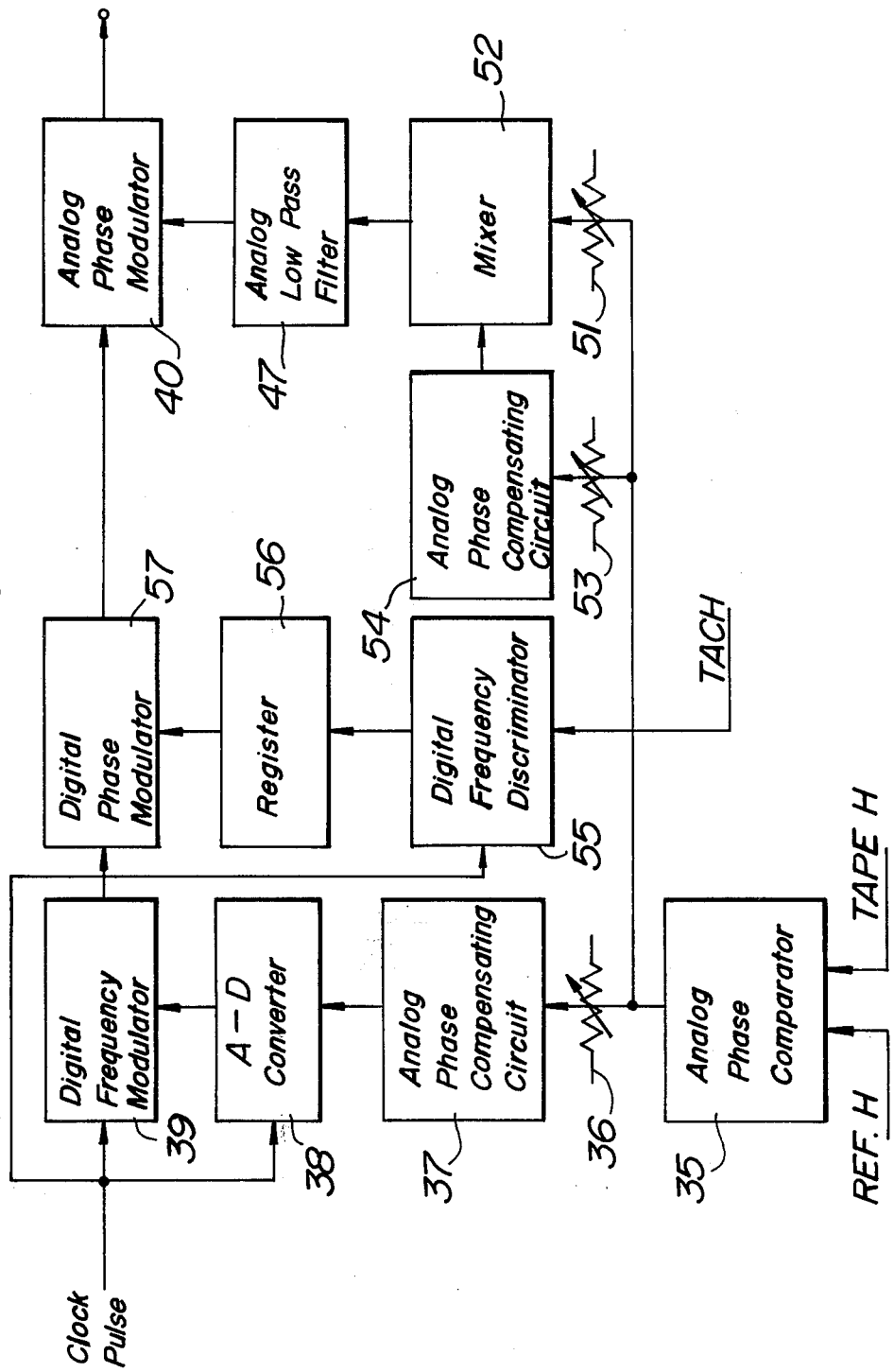
FIG_6

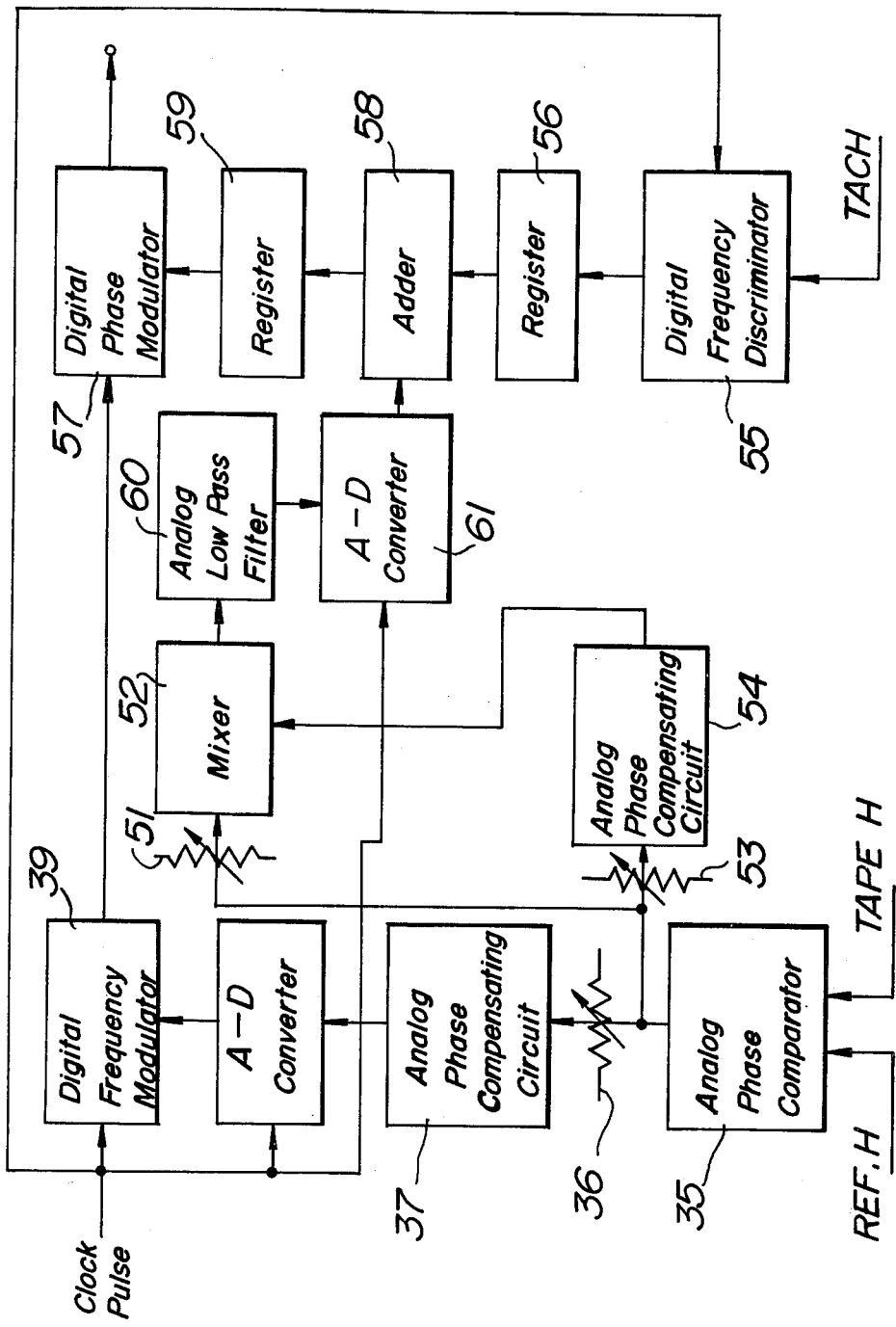
FIG_7

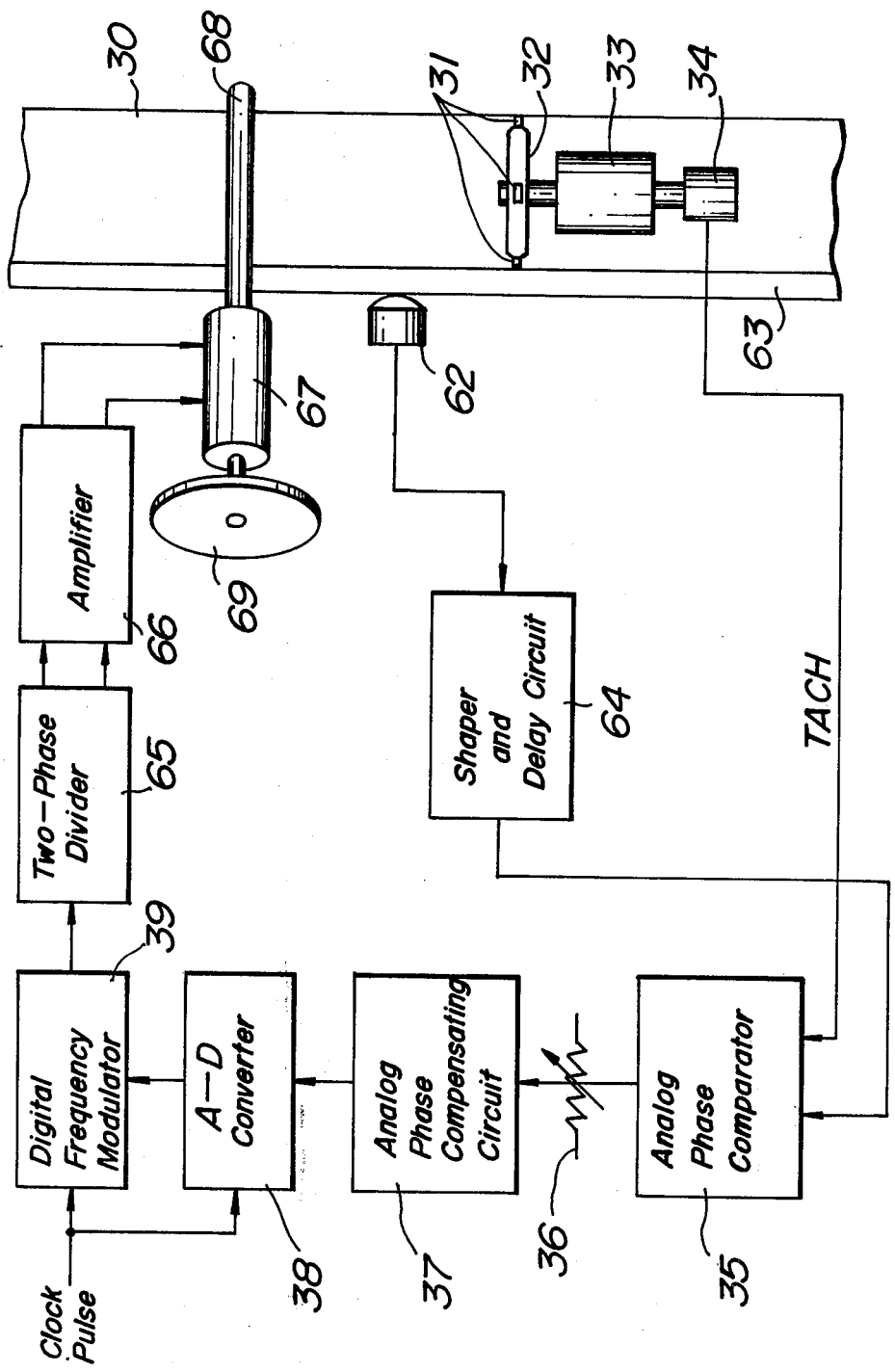
FIG_8

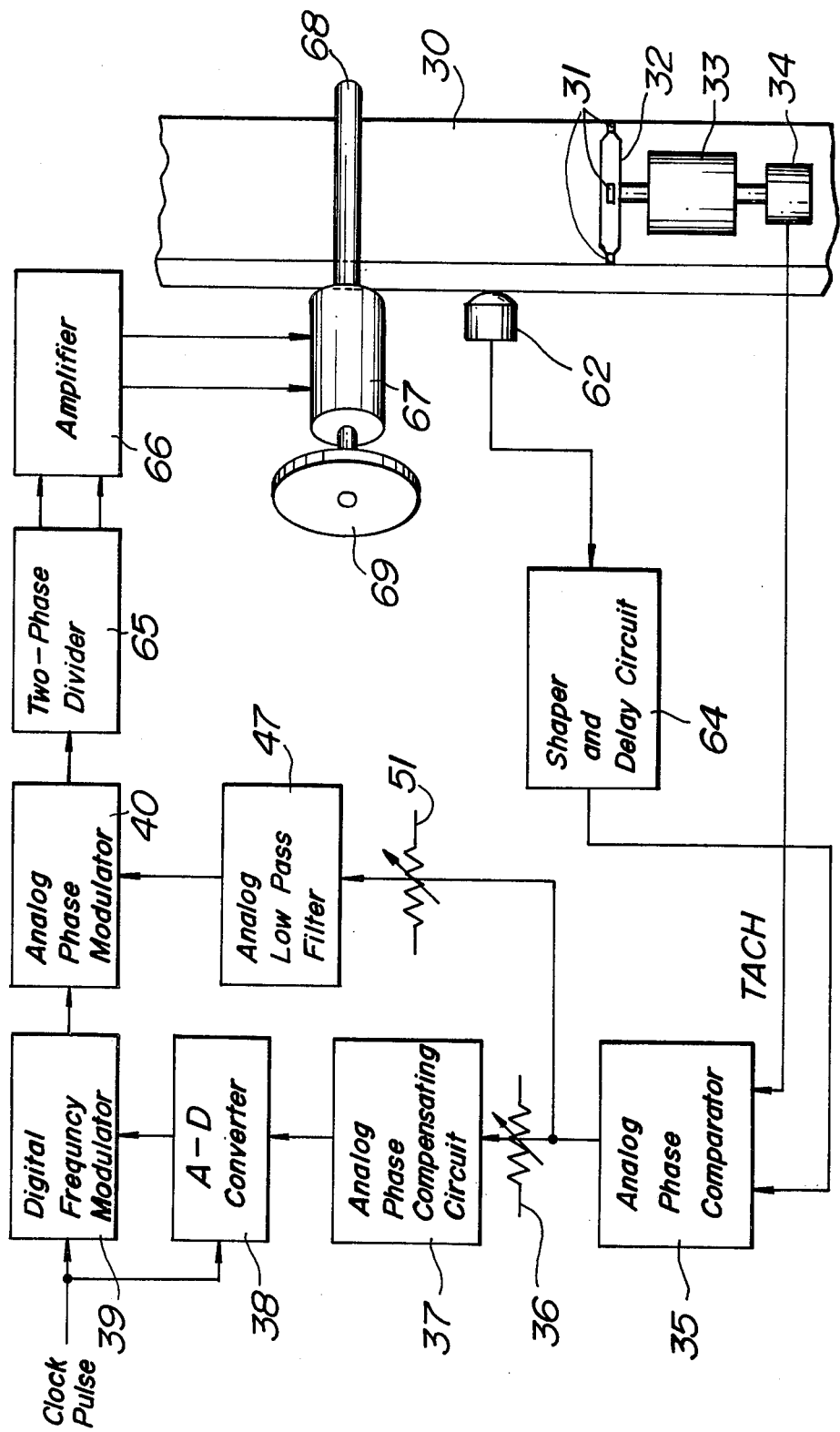

HYBRID SERVO CONTROL SYSTEM

BACKGROUND OF THE INVENTION

1. Field of the Invention

The present invention relates generally to a servo control system and more particularly to a servo control system for controlling a capstan motor or a head motor of a video tape recording and/or reproducing apparatus (hereinafter referred as VTR) which requires extremely high stability and accuracy.

2. Description of the Prior Art

Hitherto the head motor of the VTR for a broadcasting purpose has been controlled by an analog servo control system. An embodiment of the known analog servo control system will be firstly explained. FIG. 1 shows such an embodiment which controls the head motor of the VTR is such a manner that a horizontal synchronizing signal in a video signal reproduced by the VTR is locked in phase with an external reference horizontal synchronizing signal during the reproducing operation. The servo control system shown in FIG. 1 comprises proportional, integral and differential control loops. In FIG. 1 a magnetic video tape 1 is continuously moved by a capstan (not shown) at a given speed in the longitudinal direction of the video tape 1.

The video signal to be reproduced has been recorded as frequency modulated signals on tracks of the video tape 1 which extend substantially at right angles with respect to the longitudinal direction of the video tape 1. The video signal (frequency modulated signal) is reproduced by video heads 2 provided on a head drum 3. The head drum 3 is driven by a head motor 4.

In order to control the rotation of the head motor 4, there is provided the integral control loop. This integral control loop comprises a signal deriving means 5 in the form of a rotary transformer or a brush for deriving the reproduced video signal from the video heads 2. The frequency modulated video signal thus derived is supplied to a demodulator 6. which demodulates the reproduced video signal and supplies the demodulated video signal to an output terminal 7. The demodulated video signal is further supplied to a horizontal synchronizing signal separator 8 which separates the horizontal synchronizing signal TAPE H from the reproduced video signal. The horizontal synchronizing signal TAPE H thus separated is supplied to a phase comparator 9, to which also is supplied a reference horizontal synchronizing signal REF. H. The reference horizontal synchronizing signal REF. H may be a horizontal synchronizing signal of a local station. The phase comparator 9 detects a phase difference between the reproduced horizontal synchronizing signal TAPE H and the reference horizontal synchronizing signal REF. H, and produces a signal (pulse signal) corresponding to said phase difference. This signal from the phase comparator 9 is applied through a phase compensating circuit 10 and a gain adjusting variable resistor 11 to a variable frequency oscillator 12 which serves as a frequency modulator. The output signal from the variable frequency oscillator 12 is supplied through a serrasoid phase modulator 13 to a three-phase divider 14. The output signals from the three-phase divider 14 are supplied via a motor driving amplifier 15 to the head motor 4. The above construction constitutes the integral control loop which can lock in phase the reproduced horizontal synchronizing signal TAPE H with the reference horizontal synchronizing signal REF. H.

As described above the servo control system shown in FIG. 1 further comprises the differential control loop. To constitute this differential control loop there is provided a detector 16 of a known construction for detecting a rotation frequency of the head motor 4. The signal detected by the detector 16 is supplied to a frequency discriminator 17 which detects a frequency deviation of the rotation frequency of the head motor 4 and produces a signal proportional to said frequency deviation. This signal is supplied through a gain adjusting variable resistor 18, a mixer 19 and a low pass filter 20 to the serrasoid phase modulator 13 as a modulating signal.

The servo control system shown in FIG. 1 further comprises the proportional control loop. For this purpose the output signal from the phase comparator 9 is supplied through a gain adjusting variable resistor 21 to the mixer 19. In the servo control system of FIG. 1 there is further provided a second differential control loop which is used in addition to the proportional control loop for further increasing the control accuracy. To constitute this second differential control loop the output signal from the phase comparator 9 is supplied via a gain adjusting variable resistor 22 and a phase compensating circuit 23 to the mixer 19.

In the above construction the phase compensating circuits 10 and 23 are analog circuit networks composed of circuit elements such as an inductance L, a capacitance C and a resistance R for compensating an amplitude and phase of the signal. As the phase compensating circuits 10 and 23 circuit networks shown in FIGS. 2a and 2b, respectively may be utilized. A circuit network illustrated in FIG. 2c may be used as the low pass filter 20.

The above mentioned control loops are constituted by the following components.

Integral Control Loop 9-10-11-12-13-14-15-4-1-2-5-6-8-9

First Differential Control Loop 17-18-19-20-13-14-15-4-16-17

Second Differential Control Loop 9-22-23-19-20-13-14-15-4-1-2-5-6-8-9

Proportional Control Loop 9-21-19-20-13-14-15-4-1-2-5-6-8-9

In the known analog type servo control system mentioned above all of the components are constructed by analog circuit components. In the integral control loop the variable frequency oscillator 12 has a function of the frequency modulator. The most important property of the variable frequency oscillator 12 is that its center frequency should be accurately coincided with a given value and that said center frequency of the given value should not fluctuate for a long time. However since the variable frequency oscillator 12 is constructed by an astable multivibrator, a Wien-bridge oscillator, LC oscillator, etc., the center frequency is liable to be affected by variations of ambient temperature and supply voltage so that there is a drawback that the center frequency is also varied.

In the frequency discriminator 17 of the first differential control loop a phase comparison is effected between the signal (TACH signal) from the motor rotation frequency detector 16 and a signal which is obtained either by delaying said TACH signal for one period or by passing said TACH signal through a parallel resonance circuit having a high Q so as to derive a frequency deviation of the motor rotation signal as an error voltage. Thus there is a disadvantage that an operating point of the frequency discriminator 17 fluctuates in accordance with the variations of ambient temperature and supply voltage.

Since the analog servo control system includes such unstable elements, the various portions in the analog servo system must be frequently readjusted to reestablish accurately the center frequency and the delay times with respect to the variable frequency oscillator 12 and the frequency discriminator 17, after a given time period has been elapsed in order to keep the control error within about 0.1 $\mu$s. Such a control error smaller than 0.1 $\mu$s is required to lock in phase the reproduced horizontal synchronizing signal TAPE H with the external reference horizontal synchronizing signal REF. H in the broadcasting VTR.

In order to avoid the above drawbacks, a digital servo system has been developed. For example in a specification of a U.S. patent application Ser. No. 348,418 now U.S. Pat. No. 3,836,756 there is disclosed in detail a digital servo system. In FIG. 4 of the above mentioned U.S. patent application there is shown an embodiment of the digital servo system which comprises a digital phase comparator 1', a digital frequency discriminator 2', digital gain adjusters 5', 6' and 7', a digital frequency modulator 3' and a digital phase modulator 4'. The digital phase comparator 1' converts a phase difference between a signal to be controlled and a reference signal into a binary number by means of a counter of a special construction. The digital frequency discriminator 2' also comprises a special counter which converts a frequency deviation of the signal to be controlled into a binary number. Magnitudes of these binary numbers are adjusted in the digital gain adjusters 5' and 7' by a digital operation method and are supplied to the digital frequency modulator 3' and the digital phase modulator 4', respectively as modulating signals without converting them into analog amounts.

In the digital servo system all of the components are constructed by digital circuit elements. Therefore the digital servo system is inherently not influenced by the variations of ambient temperature and supply voltage and thus the periodical checking and readjustment are not necessary.

However the digital servo system has the following two problems. Firstly in the digial servo system the phase difference and frequency deviation are converted into binary numbers and the converted binary numbers are phase-compensated in a digital mode without converting them into analog amounts. For this purpose the detection accuracy for the phase difference and frequency deviation must be made high. For example when the time base error of video signal reproduced by VTR has to be kept within 0.1 $\mu$s, it is necessary to quantize said time base error with at least ten levels. Thus a repetition frequency of clock pulses necessary for quantizing must be higher than 100 MHz. Moreover when the detection accuracy is made high, proportional coefficients of the detectors are increased and it results in instability of the control loops. In order to avoid this instability, proportional coefficients of the digital modulators must be decreased and accordingly the repetition frequency for these modulators must be increased. In this manner the number of the components of the complicated modulators becomes large and moreover it is necessary to use the elements having a high operation speed. Therefore the cost of the digital servo system will be greatly increased.

Secondly even if in the near future high speed elements could be obtained at a low cost, the construction of the digital phase compensating circuit would be complicated. Moreover in order to improve the control property the sampling frequency for quantizing must be made high and thus the cost of the digital phase compensating circuits having a complicated operational function will be extremely increased.

SUMMARY OF THE INVENTION

The present invention has for its object to provide a hybrid servo control system which utilizes the above mentioned advantages of the analog servo control system and the digital servo control system and at the same time obviates the above mentioned disadvantages of both systems.

It is another object of the invention to provide a hybrid servo control system wherein the variation of the center frequency of the frequency modulator and the instability of the frequency discriminator which are considered to be the greatest disturbance are avoided by constructing them as the digital frequency modulator and the digital frequency discriminator and further in order to attain the high accuracy for phase comparison without increasing the repetition frequency of the clock pulses, the phase comparator is constructed as the analog phase comparator so that the very high accuracy can be obtained even with using the clock pulses of the relatively low repetition frequency and moreover use can be made of the analog gain adjusters of the simple construction which possess the continuous adjusting property and the analog phase compensating filters of the quite simple construction.

A hybrid servo control system according to the invention comprises an integral control loop in which the phase difference is detected by an analog phase comparator in an analog mode, the analog signal corresponding to the detected phase difference is passed through an analog gain adjuster and an analog phase compensating circuit and then is converted by an A-D converter into a digital amount (binary number) and this converted binary number is supplied to a digital frequency modulator as a modulating signal.

In one embodiment of the hybrid servo control system according to the invention, the frequency deviation of the signal to be controlled is detected by a digital frequency discriminator which operates on the basis of the clock pulses and the digital amount corresponding to the detected frequency deviation is converted by a D-A converter into an analog amount and the converted analog signal is supplied through an analog gain adjuster and an analog filter to an analog phase modulator as a modulating signal so as to form a first differential control loop.

According to another embodiment of the invention the analog signals derived directly and through a phase compensating circuit from the analog phase comparator are mixed and the combined analog signal is supplied through an analog low pass filter to the analog phase modulator so as to form a proportional control loop and a second differential control loop, respectively.

BRIEF DESCRIPTION OF THE DRAWINGS

Now the present invention will be explained in detail with reference to the accompanying drawings, in which:

FIG. 1 is a block diagram of a known analog servo control system for controlling a head motor of a video tape recorder for magnetically reproducing a video signal;

FIGS. 2a, 2b and 2c are circuit diagrams of analog phase compensating circuits and analog low pass filter used in the analog servo control system;

FIG. 3 is a block diagram showing a first embodiment of a hybrid servo control system according to the invention which comprises an integral control loop and a first differential control loop;

FIGS. 4(a) to 4(p) show waveforms of various signals for explaining the operation of the hybrid servo control system of FIG. 3;

FIG. 5 is a block diagram of a second embodiment of the hybrid servo control system of the invention, which includes all of the integral, first differential, proportional and second differential control loops;

FIG. 6 is a block diagram of a third embodiment of the hybrid servo control system of the invention;

FIG. 7 is a block diagram of a fourth embodiment of the hybrid servo control system of the invention;

FIG. 8 is a block diagram of the hybrid servo control system of the invention, which comprises only an integral control loop for controlling a capstan motor of the video tape recorder; and FIG. 9 is a block diagram of the hybrid servo control system according to the invention, which includes the integral and proportional control loops.

DESCRIPTION OF THE PREFERRED EMBODIMENT

FIG. 3 shows a first embodiment of the hybrid servo control system according to the invention which includes the integral control loop and the differential control loop for controlling the head motor of VTR in such a manner that a rotation phase of a rotating shaft of the head motor of VTR is synchronized with an external reference signal. A video signal previously recorded on tracks of a video tape 30 is reproduced by video heads 31 provided on a head drum 32 which is driven by a head motor 33. In order to derive a signal representing the rotation phase of the head drum 32, there is secured a detector 34 to the shaft of the head motor 33. From the detector 34 there is produced a signal (pulse) representing the rotation phase and frequency of the head drum 32. Hereinafter this signal is referred as a TACH signal. The TACH signal thus derived is supplied to an analog phase comparator 35 to which is also supplied an external reference signal. In the present embodiment the external reference signal is a reference vertical synchronizing signal REF. V of the television signal. FIG. 4(a) shows the reference signal (pulse) REF. V and FIG. 4(b) illustrates the TACH signal (pulse). A phase difference between the TACH signal and the reference signal REF. V is converted into an analog voltage by the analog phase comparator 35. In this phase comparator 35 a trapezoidal wave is produced by means of the reference signal REF. V as shown in FIG. 4(d) and a potential of this trapezoidal wave is gated out by means of the TACH signal. The gated out potential is held in a capacitor for a sampling period so as to obtain an output signal as depicted in FIG. 4(e). In this manner the analog voltage signal corresponding to the phase difference or phase error is produced. The analog voltage thus obtained is passed through an analog gain adjuster 36 in the form of a variable resistor so as to suitably adjust the magnitude of the analog voltage signal. Then the analog voltage signal having the gain adjusted is supplied to a linear analog phase compensating circuit 37 which suitably compensates the amplitude and phase of the analog voltage signal. The analog voltage signal from the analog phase compensating circuit 37 is shown in FIG. 4(f). This analog voltage signal is further supplied to an analog-digital converter 38 and is converted into a digital amount, i.e. a binary number. This A–D converter 38 may be a known A–D converter of a serial comparison type which operates on the basis of clock pulses. The binary number having a magnitude which corresponds to the phase difference between the TACH signal and the reference signal REF. V is supplied to a digital frequency modulator 39 as a modulating signal. The digital frequency modulator 39 comprises a counter for counting down the clock pulses and the count down ratio of the counter is varied in accordance with the binary number so as to effect the digital frequency modulation.

The digital frequency modulator 39 operates as follows. As described above, the counter provided in this modulator 39 counts said clock pulses supplied from the clock pulse generator and produces a self-reset pulse when the counted value reaches a predetermined value Nc. At a predetermined timing during the counting operation there is produced a write-in pulse. By means of this write-in pulse the digital amount, i.e., the binary number supplied from the A–D converter 38 is transferred into the counter. Therefore, an interval of successive self-reset pulses is changed in dependence upon the digital amount which has been transferred so that the repetition frequency of the self-reset pulses is changed. The digital frequency modulator is so constructed that when the transferred digital amount is equal to a predetermined value $N_R$ (which corresponds to a case that a phase difference between the TACH signal and the reference signal is zero), the repetition frequency $1/T_R$ of the self-reset pulse becomes equal to a center frequency of the signal supplied to the system to be controlled. As a result, when the transferred digital amount is larger than $N_R$ by N (that is the phase of the TACH pulse is lagging with respect to the $N_R$ by N (that is the phase of the TACH pulse is lagging with respect to the reference signal), the interval of the self-reset pulses is decreased by T as shown in FIG. 4(h), so that the repetition frequency of the self-reset pulses is made higher.

The A–D converter 38 produces a pulse at each end of the conversion. This pulse is illustrated in FIG. 4(c) and is used as a write-in pulse for writing the converted binary number into a register provided in the digital frequency modulator 39. FIG. 4(g) shows the binary number stored in the register and FIG. 4(h) illustrates a count value of the counter in the digital frequency modulator 39. FIG. 4(i) shows output frequency modulated pulses from the digital frequency modulator 39. This frequency modulated pulse is supplied to an analog phase modulator 40 as a signal to be modulated. The output signal from the analog phase modulator 40 is further supplied through a three-phase divider 41 in the form of a ring counter and a motor driving amplifier 42 to the head motor 33.

The control loop just described above serves as the integral control loop which is the most important control loop for effecting the phase control in VTR.

The embodiment shown in FIG. 3 further comprises a first differential control loop. For this purpose the TACH signal is supplied to a digital frequency discriminator 43 to which is also supplied the clock pulses. The digital frequency discriminator 43 comprises a counter which produces a binary number corresponding to a frequency deviation of the TACH signal with the aid of the clock pulses. This binary number is stored in a register 44 for a sampling period. FIG. 4(j) shows a count value of the counter in the digital frequency discriminator 43 and FIG. 4(k) illustrates the binary number stored in the register 44. The binary number stored in the register 44 is converted by a digital-analog converter 45 into an analog signal shown in FIG. 4(l). The D-A converter 45 may be a known D-A converter of a stair type. The analog signal thus converted is supplied to a gain adjuster 46 in the form of a variable resistor so as to adjust its amplitude in an analog mode. The analog signal is further supplied to an analog low pass filter 47 so as to suitably reduce its high frequency component. The analog signal from the filter 47 is shown in FIG. 4(m). This analog signal is supplied to an analog phase modulator 40 in the form of a serrasoid phase modulator as a modulating signal. In the analog phase modulator 40 a serrasoid wave is formed by means of the frequency modulated pulse from the digital frequency modulator 39 and the phase modulation is carried out on the basis of the analog signal supplied from the analog low pass filter 47. FIG. 4(n) illustrates the serrasoid wave produced in the analog phase modulator 40 and FIG. 4(o) shows the phase modulator output signal from the phase modulator 40. This output signal is the frequency and phase modulated pulse and is supplied to the three-phase divider 41. From the ring counter 41 there are produced three-phase rectangular waves having a relative phase difference of 120° as shown in FIG. 4(p).

The control loop mentioned above is referred as the first differential control loop which serves to avoid harmful influence due to a resonant property inherent to the head motor 33 of VTR. As apparent from the above description according to the invention the following advantages can be obtained. Since use is made of the analog phase comparator 35 the detection accuracy of the phase difference can be made high. This analog phase comparator 35 produces the analog voltage signal corresponding to the phase difference, therefore the adjustment of the gain of this analog signal can be effected by the simple and cheap analog gain adjuster 36. Also the amplitude and the phase of the said gain adjusted analog signal can be adjusted by the analog phase compensating circuit 37 which may be the simple filter composed of resistors $R_1$, $R_2$ and a capacitor $C_1$ as shown in FIG. 2(a). The repetition frequency of the clock pulses for the digital frequency modulator 39 can be made lower so that the construction of this digital frequency modulator 39 can be simple and thus its cost becomes lower. The operational property of the digital frequency discriminator 43 is hardly affected by the variations of ambient temperature and supply voltage and thus the first differential control loop becomes very stable. Since the binary number corresponding to the frequency deviation is converted into the analog amount which is supplied to the analog phase modulator 40 through the analog gain adjuster 46 and the analog filter 47, the construction of the said analog gain adjuster 46 and the analog low pass filter 47 can be simple. For example as the analog filter 47, the simple filter composed of a resistor $R_5$, capacitors $C_3$, $C_4$ and $C_5$ and an inductor $L_1$ as shown in FIG. 2(c) can be used.

FIG. 5 shows a second embodiment of the hybrid servo control system according to the invention. The present embodiment includes in addition to the integral and first differential control loops a proportional control loop for improving the property against disturbances of high frequency components so as to widen the control bandwidth and a second differential control loop which contributes to further improve the control accuracy of the whole servo control system. In FIG. 5, the same components as those shown in FIG. 3 are denoted by the same reference numerals as those used in FIG. 3. The construction and operation of the integral control loop and the first differential control loop are substantially same as those of the first embodiment shown in FIG. 3. But in the present embodiment the phase difference between the horizontal synchronizing signal TAPE H of the video signal reproduced by the video tape recorder and a reference horizontal synchronizing signal REF. H is detected. To this end the video signal (frequency modulated signal) reproduced by the video heads 31 is supplied through a signal deriving device 48 in the form of a rotary transformer or a brush to a demodulator 49. The demodulated video signal is further supplied to a horizontal synchronizing signal separator 50 in which the horizontal synchronizing signal is extracted. The extracted horizontal synchronizing signal TAPE H is supplied to the analog phase comparator 35.

In the proportional control loop the analog voltage signal derived from the analog phase comparator 35 and corresponding to the phase difference between the reproduced horizontal synchronizing signal TAPE H and the reference horizontal synchronizing signal REF. H is supplied through an analog gain adjuster 51 to a mixer 52. In the second differential control loop the analog voltage signal from the analog phase comparator 35 is supplied through an analog gain adjuster 53 and an analog phase compensating circuit 54 to the mixer 52. In the mixer 52 the analog signals supplied from the gain adjuster 46, the gain adjuster 51 and the analog phase compensating circuit 54 are mixed and the combined analog signal is supplied to the analog phase modulator 40 through the analog low pass filter 47 as the phase modulating signal. Also in the present embodiment the construction of the analog gain adjusters 51 and 53 can be simple and further the construction of the analog phase compensating circuit 54 can be also simple. The analog phase compensating circuit composed of resistors $R_3$ and $R_4$ and a capacitor $C_2$ as shown in FIG. 2(b) can be used as the analog phase compensating circuit 54.

In the present embodiment the clock pulses having the repetition frequency of 6.8 MHz are generated by a crystal oscillator having a high frequency accuracy and stabilization. The digital frequency modulator 39 is formed by a binary counter of a synchronous type having thirteen stages and the analog phase modulator 40 is composed of a serrasoid phase modulator. Further the A-D converter 38 is of a known serial comparison type and the D-A converter 45 is of a known converter of a stair type. The register 44 is of a parallel type and the digital frequency discriminator 43 is constructed by a binary counter of a synchronous type. The analog phase compensating circuits 37 and 54 are formed by the circuits shown in FIGS. 2a and 2b and the analog low pass filter 47 is constructed as illustrated in FIG. 2c. The analog phase comparator 35 is composed of a known sampling circuit and an inclination of the trapezoidal voltage is set to 0.5 μs/V. The mixer 52 is constructed by a known common emitter type. By controlling the head motor 33 by means of such a hybrid servo system the control error can be kept within 0.05 μs.

FIG. 6 illustrates a third embodiment of the hybrid servo control system according to the invention. The components of this embodiment which are same as those of the previous embodiments are denoted by the same reference numerals as those used in FIGS. 3 and 5. In the present embodiment the integral control loop is constructed as the hybrid type. That is to say the integral control loop includes the analog phase comparator 35, the analog gain adjuster 36, the analog phase compensating circuit 37, the A–D converter 38 and the digital frequency modulator 39. In the analog phase comparator 35, the phase difference between the reproduced horizontal synchronizing signal TAPE H and the reference horizontal synchronizing signal REF. H is detected. In the present embodiment the first differential loop is constructed as a pure digital control loop. That is to say the first differential control loop is composed of a digital frequency discriminator 55, a resistor 56 and a digital phase modulator 57. In the present embodiment the accuracy of the detection for the frequency deviation is not necessary to be so high, therefore the repetition frequency of the clock pulses used in the digital frequency discriminator 55 can be made still low. Furthermore, there are provided the proportional control loop and the second differential control loop which are formed as the analog control loops like as the second embodiment shown in FIG. 5.

FIG. 7 illustrates a fourth embodiment of the hybrid servo control system according to the invention. In the present embodiment the hybrid integral control loop includes the analog phase comparator 35, the analog gain adjuster 36, the analog phase compensating circuit 37, the A–D converter 38 and the digital frequency modulator 39. The first differential control loop is constituted as a pure digital differential control loop, which comprises the digital frequency discriminator 55, the register 56, an adder 58, a register 59 and the digital phase modulator 57. In the present embodiment there are further provided a hybrid proportional control loop and a hybrid second differential control loop. That is to say the analog signal from the analog phase comparator 35 is supplied through the analog gain adjuster 51 and through the analog gain adjuster 53 and the analog phase compensating circuit 54 to the mixer 52. The combined analog signal from the mixer 52 is supplied through an analog low pass filter 60 to an analog-digital converter 61. The digital signal converted by the A–D converter 61 is further supplied to the adder 58 in which the converted digital signal is added to the digital signal supplied from the register 56. In the present embodiment the integral control loop is entirely same as those of the previous embodiments. In the digital differential control loop, the frequency deviation of the TACH signal is digitally detected and the detected frequency deviation (binary number) is stored in the register 56 and then is further supplied through the adder 58 and the register 59 to the digital phase modulator 57 without converting said binary number into an analog amount. In the proportional and second differential control loops, the phase difference between the reproduced horizontal synchronizing signal TAPE H and the reference horizontal synchronizing signal REF. H is detected by the analog phase comparator 35 to produce the analog voltage signal corresponding to said phase difference. The amplitude of said analog voltage signal is suitably adjusted by the analog gain adjuster 51 and the adjusted signal is supplied to the mixer 52. At the same time, after the gain of said analog voltage signal from the analog phase comparator 35 is suitably adjusted by the analog gain adjuster 53, phase and amplitude of the analog voltage signal are compensated by the high frequency compensating circuit 54. The analog signal having the gain and phase thus adjusted is supplied to the mixer 52 and mixed with the analog voltage signal supplied from the analog gain adjuster 51. The mixed output signal from the mixer 52 is supplied through the low pass filter 60 to the A–D converter 61. The binary number from the A–D converter 61 is added with the binary number supplied from the digital frequency discriminator 55 and corresponding to the frequency deviation of the TACH signal. In this case bias counts of the binary numbers supplied to the adder 58 are determined in such a number that a sum of these bias counts becomes equal to a bias count of the digital phase modulator 57, said bias count corresponding to the frequency deviation of zero.

FIG. 8 illustrates a fifth embodiment of the hybrid servo control system according to the invention which is applied to the servo control for the capstan motor of the VTR. In this embodiment there is provided a control track head 62. Upon recording the video signal (frequency modulated signal) on the video tape 30 by means of the video heads 31, the signal supplied from the head motor rotation frequency detector 34 is recorded on a control track 63 provided on a part of the video tape 30 by means of the control track head 62. During the reproduction said signal recorded on the control track 63 is reproduced by the control track head 62 and the reproduced signal is supplied through a waveform shaper and delay circuit 64 to the analog phase comparator 35. To the analog phase comparator 35 is also supplied the TACH signal from the detector 34. In the present embodiment the construction of the hybrid integral control loop is exactly same as that of the previous embodiments. But in the present embodiment the frequency modulated output pulse from the digital frequency modulator 39 is supplied to a two-phase divider 65 which produces two rectangular signals having relative phase difference of 90°. These rectangular signals are amplified by a capstan motor driving amplifier 66 and the amplified signals are supplied to a capstan motor 67 which drives a capstan 68. By means of the present embodiment the precise video head tracking can be obtained. When the repetition frequency of the clock pulse is set to about 1 MHz, the digital frequency modulator 39 is constructed by a binary counter of thirteen stages of a synchronous type, the A–D converter 38 is formed by a known serial comparison type and the analog phase compensating circuit 37 is constructed by the circuit shown in FIG. 2a, it is possible to keep the travelling time base error (which means jitter and drift of the capstan servo) of the magnetic tape 30 within 30 μs.

In the above fifth embodiment in order to avoid the resonant characteristic of the synchronous motor 67 for the capstan 68, a large flywheel 69 is coupled with the synchronous motor 67. This results in the apparent decrease of the resonant frequency of the synchronous motor 67 and thus the control bandwidth of the servo system is decreased. But the feature of decreasing the control bandwidth of the servo system is not preferable for disturbances including high frequency components. In order to avoid such a disadvantage there may be provided a proportional control loop in addition to the integral control loop so as to widen the control bandwidth of the servo system.

FIG. 9 shows a sixth embodiment of the hybrid servo control system according to the invention, in which the proportional control loop is provided in addition to the integral control loop. In the present embodiment the proportional control loop comprises the analog phase comparator 35, the analog gain adjuster 51, the analog low pass filter 47 and the analog phase modulator 40.

As apparent from the above description according to the hybrid servo control system of the invention, since use is made of the digital frequency modulator as the frequency modulator forming the integral control loop, the stable carrier as compared with the oscillating frequency from a variable frequency oscillator can be obtained and it is not necessary to readjust the frequency of the carrier. Moreover since the phase comparator and phase modulator of analog type are used, the repetition frequency of the clock pulses can be lower than 10 MHz, and thus general digital integrated circuits for industrial uses can be utilized. Further the frequency modulator and frequency discriminator are of digital type, so that their operation could not be affected by variations of ambient temperature and supply voltage. The gain adjusters, phase compensating circuit, filter, mixer, etc. can be formed as analog circuits of simple construction.

The various advantages of the present invention can be summarized as follows:
1. A very high accuracy of control can be achieved even with the low frequency clock pulses as compared with the all digital servo control systems.
2. It is not necessary to provide a digital gain adjuster having a discrete adjusting property.
3. It is not necessary to use a complicated digital phase compensating circuit.
4. Thus, the hybrid servo control system of the invention can be very cheap as compared with all digital serve control systems and is particularly suitable for the control system of a VTR.

We claim:
1. A hybrid servo control system with an integral control loop comprising:
   means for producing a signal which represents the operational phase and frequency of a system to be controlled;
   an analog phase comparator means for detecting a phase difference between said signal and a reference signal and producing an analog amount proportional to said detected phase difference;
   an analog-digital converter means for converting said analog amount supplied from said analog phase comparator means into a digital amount and storing said digital amount;
   a clock pulse generator means for producing clock pulses of a given repetition frequency;
   a digital frequency modulator means for receiving as input signals both of said digital amount supplied from said analog-digital converter and said clock pules supplied from said clock pulse generator means and having a counter which counts down said clock pulses with a count down ratio depending on said digital amount so as to produce frequency-modulated carrier pulses;
   means for forming a driving signal to drive said system to be controlled from said frequency-modulated carrier pulses supplied from said digital frequency modulator;
   means for supplying said driving signal to said system to be controlled;
   an analog gain adjuster means arranged between said analog phase comparator means and said analog-digital converter means for adjusting the gain of said analog amount; and
   an analog phase compensating circuit means arranged between said analog phase comparator means and said analog-digital converter means for compensating the phase characteristic of said analog amount.

2. A hybrid servo control system according to claim 1, wherein said hybrid servo control system further comprises a proportional control loop for increasing the control bandwidth of the control system and said proportional control loop comprises:
   an analog phase modulator means inserted between said digital frequency modulator means and said driving signal forming means for receiving as a carrier signal said frequency-modulated carrier pulses supplied from said digital frequency modulator means and phase modulating this carrier signal by a modulating signal so as to produce phase-modulated carrier pulse;
   means for supplying the analog amount produced by said analog phase comparator to said analog phase modulator as said modulating signal;
   a second analog gain adjuster means inserted in said supplying means for adjusting the gain of the modulating signal; and
   an analog low pass filter means inserted in said supplying means for suppressing high frequency components in the modulating signal.

3. A hybrid servo control system according to claim 1, wherein said system to be controlled is a capstan motor for driving a magnetic tape in a video recorder and said hybrid servo control system further comprises:
   means for detecting the phase of a signal which has been previously recorded on a control track of said magnetic tape;
   means for waveform-shaping and delaying the output signal from said phase detecting means;
   means for supplying the output signal from said waveform-shaping and delaying means to said analog phase comparator means; and
   means for driving said capstan motor by means of the frequency-modulated carrier pulses supplied from said digital frequency modulator means.

4. A hybrid servo control system according to claim 2, wherein said system to be controlled is a capstan motor for driving a magnetic tape in a video tape recorder and said hybrid servo control system further comprises:
   means for detecting the phase of a signal which has been previously recorded on a control track of said magnetic tape;
   means for waveform-shaping and delaying the output signal from said phase detecting means;

means for supplying the output signal from said waveform-shaping and delaying means to said analog phase comparator means; and means for driving said capstan motor by means of the phase-modulated carrier pulses supplied from said analog phase modulator means.

5. A hybrid servo control system according to claim 1, wherein said hybrid servo control system further comprises a first differential control loop for improving a damping characteristic of the control system and said first differential control loop comprises;

a digital frequency discriminator means for receiving as input signals both of the signal representing operational phase and frequency of the system to be controlled and the clock pulses from said clock pulse generator means and having a counter means for converting a variation of a period of said signal into a digital amount corresponding to the number of clock pulses;

register means for storing said digital amount from said frequency discriminator;

a digital-analog converter means for converting said digital amount supplied from said digital frequency discriminator means into an analog amount;

an analog phase modulator means connected to outputs of said digital frequency modulator means and said digital-analog converter means for receiving said frequency-modulated carrier pulses as a carrier signal and said analog amount as a modulating signal and phase modulating said carrier signal by means of said modulating signal so as to produce phase-modulated carrier pulses which are supplied to said driving signal forming means;

a second analog gain adjuster means arranged between the digital-analog converter means and the analog phase modulator means for adjusting the gain of said converted analog amount; and an analog low pass filter means arranged between the digital-analog converter means and the analog phase modulator means for suppressing high frequency components of the analog amount.

6. A hybrid servo control system according to claim 5, wherein said system to be controlled is a head drum motor of a video tape recorder and said hybrid servo control system further comprises:

means for detecting a signal which represents rotational phase and frequency of said head drum motor;

means for supplying said detected signal to said analog phase comparator means and to said digital frequency discriminator; and means for driving said head drum motor by means of the phase-modulated carrier pulses supplied from said analog phase modulator means.

7. A hybrid servo control system according to claim 5, wherein said hybrid servo control system further comprises a proportional control loop for increasing a control bandwidth of the control system which includes:

a mixer inserted between said second analog gain adjuster means and said analog low pass filter means and having a first input connected to the output of said second analog gain adjuster means, a second input and an output connected to the input of said analog low pass filter means; and means for supplying the analog amount supplied from said analog phase comparator means to said second input of said mixer, said supplying means including a third analog gain adjuster means.

8. A hybrid servo control system according to claim 7, wherein said mixer further comprises a third input and said hybrid servo control system further comprises a second differential control loop for improving a response characteristic of the control system which includes:

a fourth analog gain adjuster means for adjusting the gain of the analog amount supplied from said analog phase comparator means;

an analog phase compensating means for compensating phase of the analog amount; and means for supplying said gain adjusted and phase compensated analog amount to said third input of said mixer.

9. A hybrid servo control system according to claim 8, wherein said system to be controlled is a head drum motor of a video tape recorder and said hybrid servo control system further comprises:

means for detecting a signal which represents rotational phase and frequency of said head drum motor;

means for supplying said detected signal to said digital frequency discriminator means;

means for deriving a reproduced signal of a video signal which has been previously recorded on a magnetic tape of said video tape recorder;

means for demodulating said reproduced signal;

means for separating a horizontal synchronizing signal from the demodulated video signal;

means for supplying the separated horizontal synchronization signal to said analog phase comparator means;

means for supplying an external horizontal synchronizing signal to said analog phase comparator means as the reference signal; and means for driving said head drum motor by means of the phase-modulated carrier pulses supplied from said analog phase modulator means.

10. A hybrid servo control system according to claim 1, wherein said hybrid servo control system further comprises a first differential control loop for improving a damping characteristic of the control system and said first differential control loop comprises:

a digital frequency discriminator means for receiving as input signals both of the signal representing operational phase and frequency of the system to be controlled and the clock pulses from said clock pulse generator means and having a counter means for converting a variation of a period of said signal into a digital amount corresponding to the number of clock pulses;

register means for storing said digital amount; and a digital phase modulator means connected to outputs of said digital frequency modulator means and said register means for receiving the frequency-modulated carrier pulses from said digital frequency modulator means as a carrier signal and said digital amount from said resister means as a modulating signal and phase-modulating said carrier signal by means of said modulating signal so as to produce phase-modulated carrier pulses which are supplied to said driving signal forming means.

11. A hybrid servo control system according to claim 10, wherein said hybrid servo control system further comprises a proportional control loop for increasing the control bandwidth of the control system and a second differential control loop for improving a response characteristic of the control system which includes:
- a second analog gain adjuster connected to the output of said analog phase comparator means;
- a mixer having a first input connected to the output of said second analog gain adjuster, a second input and an output;
- a third analog gain adjuster connected to the output of said analog phase comparator means;
- an analog phase compensating circuit having an input connected to said third analog gain adjuster and an output connected to said second input of said mixer;
- an analog low pass filter having an input connected to said output of said mixer and an output; and
- an analog phase modulator means having a first input connected to said output of said analog low pass filter for receiving the analog amount as a modulating signal, a second input connected to the output side of said digital frequency modulator means for receiving the frequency-modulated carrier pulses as a carrier signal and phase-modulating said carrier signal by means of said modulating signal so as to produce phase-modulated carrier pulses which are supplied to said driving signal forming means.

12. A hybrid servo control system according to claim 10, wherein said hybrid servo control system further comprises:
- an analog low pass filter means for suppressing a high frequency component of the analog amount supplied from said analog phase comparator means;
- an analog-digital converter means for converting the output analog amount supplied from said analog low pass filter means into a digital amount; and
- an adder means having a first input connected through a first portion of said resistor means to the output of said digital frequency discriminator means, a second input connected to the output of said analog-digital converter means and an output connected through a second portion of said resister means to the input of the digital phase modulator means for combining the digital amount from said digital frequency discriminator means with each other so as to produce a combined digital amount which is supplied to said digital phase modulator means as the modulating signal.

13. A hybrid servo control system according to claim 12, wherein said hybrid servo control system further comprises:
- a second analog gain adjuster connected to the output of said analog phase comparator means;
- a mixer having a first input connected to the output of said second analog gain adjuster, a second input and an output connected to the input of said analog low pass filter; and
- a third analog gain adjuster connected to the output of said analog phase comparator means;
- an analog phase compensating circuit having an input connected to said output of said analog phase comparator through third analog gain adjuster and an output connected to said second input of said mixer.

14. A hybrid servo control system according to claim 3, wherein said hybrid servo control system further comprises:
- means for detecting a signal which represents rotational phase and frequency of a head drum motor of the video tape recorder; and
- means for supplying said signal representing rotational phase and frequency to said analog phase comparator means as the reference signal.

15. A hybrid servo control system according to claim 4, wherein said hybrid servo control system further comprises:
- means for detecting a signal which represents rotational phase and frequency of a head drum motor of the video tape recorder; and
- means for supplying said signal representing rotational phase and frequency to said analog phase comparator means as the reference signal.

\* \* \* \* \*